US009714721B2

(12) United States Patent
Nanahara et al.

(10) Patent No.: US 9,714,721 B2
(45) Date of Patent: Jul. 25, 2017

(54) ELECTROMAGNETIC VALVE

(71) Applicants: Masaki Nanahara, Toyota (JP); Kei Sato, Kasugai (JP); Takeshi Ishida, Nagakute (JP)

(72) Inventors: Masaki Nanahara, Toyota (JP); Kei Sato, Kasugai (JP); Takeshi Ishida, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/765,225

(22) PCT Filed: Mar. 11, 2013

(86) PCT No.: PCT/JP2013/056585
§ 371 (c)(1),
(2) Date: Jul. 31, 2015

(87) PCT Pub. No.: WO2014/141359
PCT Pub. Date: Sep. 18, 2014

(65) Prior Publication Data
US 2015/0369387 A1 Dec. 24, 2015

(51) Int. Cl.
F16K 31/06 (2006.01)
B60T 8/36 (2006.01)
(Continued)

(52) U.S. Cl.
CPC .......... F16K 31/0655 (2013.01); B60T 7/042 (2013.01); B60T 8/363 (2013.01); B60T 13/686 (2013.01); F16K 1/36 (2013.01)

(58) Field of Classification Search
CPC ...... F16K 31/0655; F16K 1/36; B60T 13/686; B60T 7/042; B60T 8/363
(Continued)

(56) References Cited

U.S. PATENT DOCUMENTS 3,523,676 A * 8/1970 Barker ................ F16K 31/0658
251/129.05
7,973,627 B2 * 7/2011 Yamagata ............. H01F 7/1607
251/129.15
(Continued)

FOREIGN PATENT DOCUMENTS

JP 6-137453 A 5/1994
JP 9-119552 A 5/1997
(Continued)

OTHER PUBLICATIONS

International Search Report issued Jun. 4, 2013 in PCT/JP2013/056585 filed Mar. 11, 2013.
(Continued)

Primary Examiner — John K Fristoe, Jr.
Assistant Examiner — Ian Paquette
(74) Attorney, Agent, or Firm — Oblon, McClelland, Maier & Neustadt, L.L.P.

(57) ABSTRACT

In an electromagnetic valve in which a valve body unit is housed in a housing, the unit has a plunger including a groove portion at its cylindrical outer peripheral face. The groove portion extends in the cylinder axis direction and moves in the cylinder axis direction by an electromagnetic force generated by an electromagnetic coil. A rod is secured to the plunger and abuts against a valve seat for opening and closing the valve when the plunger is moved to close the valve and releasing the abutment of the rod against the seat when the plunger is moved to open the valve. A cylindrical sleeve covers the outer peripheral face of the plunger and is configured integrally with the plunger. A communication passage defined by the groove portion of the plunger and the inner peripheral face of the sleeve extends in the cylinder axis direction.

4 Claims, 4 Drawing Sheets

(51) Int. Cl.
    *B60T 7/04*           (2006.01)
    *B60T 13/68*         (2006.01)
    *F16K 1/36*          (2006.01)

(58) Field of Classification Search
    USPC .................................................. 251/129.15
    See application file for complete search history.

(56) References Cited

U.S. PATENT DOCUMENTS

| | | | |
|---|---|---|---|
| 8,678,341 B2 * | 3/2014 | Watanabe | ............... B60T 13/36 |
| | | | 251/129.15 |
| 2003/0038536 A1 | 2/2003 | Cheong | |
| 2016/0245427 A1 * | 8/2016 | Dinerman | ............. F16K 31/408 |

FOREIGN PATENT DOCUMENTS

| | | | |
|---|---|---|---|
| JP | 2000-274545 A | 10/2000 | |
| JP | 2003-63371 A | 3/2003 | |
| JP | 2008-39157 A | 2/2008 | |
| JP | 2008-164068 A | 7/2008 | |
| JP | 2011-38542 A | 2/2011 | |
| JP | 2011-99563 A | 5/2011 | |
| JP | WO 2011155603 A1 * | 12/2011 | .............. B60T 13/36 |

OTHER PUBLICATIONS

Combined Chinese Office Action and Search Report issued Dec. 13, 2016 in Chinese Patent Application No. 201380071574.1 (with English translation of categories of cited documents).

\* cited by examiner

ELECTROMAGNETIC VALVE

TECHNICAL FIELD

The invention relates to a configuration of an electromagnetic valve for activating a valve body unit by using an electromagnetic force.

BACKGROUND ART

As an example of this kind of the electromagnetic valve, an electromagnetic valve mounted on the vehicle is disclosed in the Patent Literature 1. This electromagnetic valve is configured such that a valve body unit and an electromagnetic coil are housed in a housing, the valve body unit has a plunger which can slide in the housing and a valve chamber and a spring chamber communicate with each other through a communication passage which penetrates the plunger.

CITATION LIST

Patent Literature

Patent Literature: JP 2011-38542 A

SUMMARY OF INVENTION

According to the valve body unit disclosed in the Patent Literature 1, the communication passage is provided by penetration-machining the plunger. Thus, the cost is high. On the other hand, in order to reduce the cost, the communication passage may be formed by a groove portion having a recessed shape which is provided on an outer peripheral face of the plunger by a method such as forging. However, in this case, the outer profile of the plunger provided with the groove portion having the recessed shape on the outer peripheral face of the plunger is not a true circle and thus, the sliding resistance between the plunger and the housing which houses the plunger, increases. Therefore, the valve body unit cannot be operated smoothly. In addition, such a problem may occur in the electromagnetic valve mounted on the vehicle as well as the electromagnetic valve installed in various kinds of devices other than the vehicle.

Accordingly, the invention is made in consideration of the points described above and one of the objects of the invention is to provide an effective technique for reducing the cost of the valve body unit and improving the operation performance of the electromagnetic valve in which the valve body unit is operated by using the electromagnetic force.

In order to achieve the object described above, the electromagnetic valve according to the invention is configured such that a valve body unit and an electromagnetic coil are housed in a housing. The valve body unit includes a plunger, a rod, a sleeve and a communication passage. The plunger has a groove portion on a cylindrical outer peripheral face of the plunger, the groove portion extending along a direction of the cylinder axis, and is configured as a member which is operated along the direction of the cylinder axis by electromagnetic force generated by an electromagnetic coil. The rod is secured to the plunger and is configured as a member which abuts against a valve seat for opening and closing the electromagnetic valve when the plunger is moved to close the electromagnetic valve and releases the abutment against the valve seat when the plunger is moved to open the electromagnetic valve. The sleeve is configured as a cylindrical member which covers the outer peripheral face of the plunger and is integrally configured with the plunger. The communication passage is defined by the groove portion of the plunger and an inner peripheral face of the sleeve and extends in the direction of the cylinder axis. In this case, the cost of forming the communication passage is reduced, compared with the cost for forming the communication passage by penetration-machining the plunger. Further, the circularity of the sleeve can be improved by applying a desired strength to the cylindrical sleeve. Thus, the sliding resistance between the sleeve and the housing is reduced. As a result, the operation performance of the valve body unit can be improved.

In a further aspect of the electromagnetic valve according to the invention, the valve body unit may be preferably configured such that the arc length of the opening of the groove portion along the peripheral direction of the plunger is smaller than or equal to 20 times of the thickness of the sleeve along the radial direction of the sleeve. In this case, when a value suitable for the thickness of the sleeve is set to the arc length of the opening of the groove portion, the desired circularity of the sleeve can be ensured. For example, the circularity of the sleeve (the difference between the geometric true circle of the circular body and the circle corresponding to the shape of the sleeve) can be suppressed to about 1 [μm]. On the other hand, when the arc length of the opening of the groove portion exceeds 20 times of the thickness of the sleeve, the arc portion of the sleeve corresponding to the opening of the groove portion is likely to deform to have the straight shape. Thus, it is difficult to ensure the desired circularity of the sleeve.

In the further aspect of the electromagnetic valve according to the invention, the sleeve may be preferably made of non-magnetic material and a dimension larger than or equal to the dimension of the sliding clearance between the outer peripheral face of the sleeve and the housing, may be preferably set to the thickness of the sleeve in the radial direction. Accordingly, the magnetic force generated by the electromagnetic coil does not act on the sleeve made of the non-magnetic material. Thus, the friction (the sliding resistance) generated between the outer peripheral face of the sleeve and the housing can be reduced. In this case, a value which meets the sliding clearance between the outer peripheral face of the sleeve and the housing, may be set to the thickness of the sleeve.

In the further aspect of the electromagnetic valve according to the invention, it is preferred that the housing has a valve chamber provided in an area corresponding to one end of the plunger for housing the rod and a spring chamber provided in an area corresponding to the other end of the plunger for housing a spring for elastically biasing the plunger against the electromagnetic force generated by the electromagnetic coil and the valve and spring chambers communicate with each other through the communication passage. Accordingly, the communication passage for communicating the valve and spring chambers with each other in the electromagnetic valve can be defined by the groove portion of the plunger and the inner peripheral face of the sleeve.

If the electromagnetic valve according to the invention is a vehicle electromagnetic valve mounted on the vehicle, the electromagnetic valve may be preferably positioned such that the direction of the cylinder axis of the plunger corresponds to the horizontal direction when the electromagnetic valve is mounted on the vehicle. In this case, the plunger preferably has a covered area where the groove portion is covered by the sleeve and a non-covered area where the groove portion is not covered by the sleeve and the groove portion corresponding to the non-covered area preferably communicates with a space outside of the sleeve at least in the horizontal direction (the first direction) and the direction (the second direction) orthogonal to the horizontal direction. Accordingly, the area of the opening of the groove portion between the covered and non-covered areas of the plunger is increased. As a result, the gas bubble existing in the space outside of the sleeve can be easily introduced from the groove portion corresponding to the non-covered area to the communication passage by the flow of the hydraulic fluid at least in two directions to discharge the gas bubble from the groove portion corresponding to the non-covered area.

Advantageous Effect of Invention

As described above, according to the invention, the cost of the valve body unit can be reduced and the operation performance of the valve body unit can be improved in the electromagnetic valve for opening and closing the valve body unit by using the electromagnetic force.

DESCRIPTION OF EMBODIMENTS

Below, an embodiment according to the invention will be described with reference to the accompanying drawings.

Figure 1:
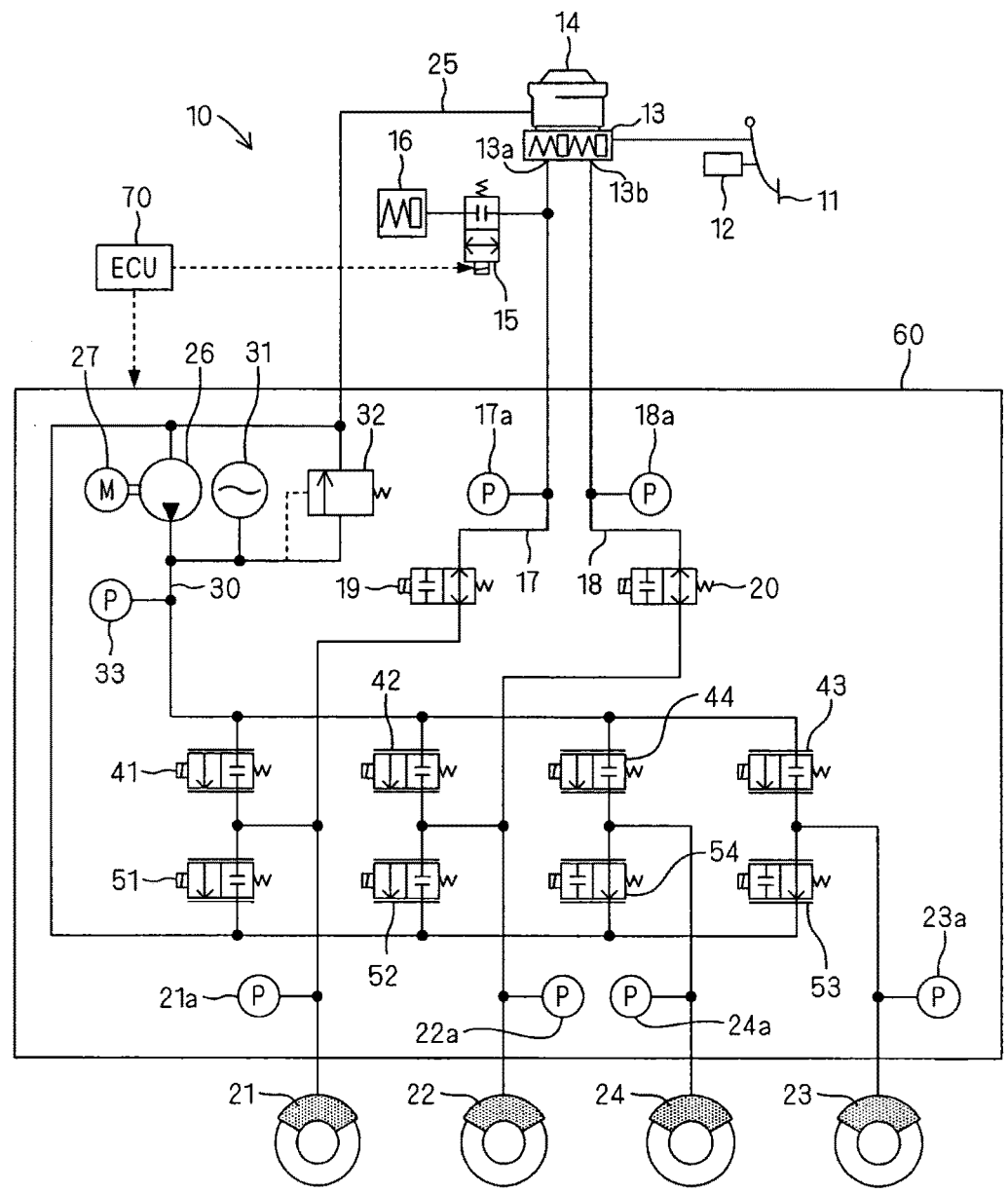
FIG. 1 is a system diagram of a brake control device 10 according to an embodiment of this application.

A brake control device 10 shown in FIG. 1 is mounted on a vehicle for controlling braking force applied to wheels of the vehicle and has a function for independently controlling the four wheels in accordance with depression manipulation of a brake pedal 11 carried out by a driver. The brake pedal 11 has a stroke sensor 12 for detecting depression stroke of the brake pedal 11 and is connected to a mass cylinder 13. The mass cylinder 13 is connected to a reserver tank 14 for reserving hydraulic fluid (or brake oil) and has output ports 13a and 13b for outputting the hydraulic fluid in accordance with the depression manipulation of the brake pedal 11, respectively.

A stroke simulator 16 is connected to the output port 13a of the mass cylinder 13 via an electromagnetic valve 15. The electromagnetic valve 15 is energized to be opened when the depression manipulation of the brake pedal 11 carried out by the driver is detected. The stroke simulator 16 has a function for generating reaction force in accordance with the depression manipulation of the brake pedal 11 carried out by the driver. A first hydraulic oil pipe 17 for the right front wheel is connected to the output port 13a. The first hydraulic oil pipe 17 is connected to a wheel cylinder 21 for applying the braking force to the right front wheel. On the other hand, a second hydraulic oil pipe 18 for the left front wheel is connected to the output port 13b. The second hydraulic oil pipe 18 is connected to a wheel cylinder 22 for applying the braking force to the left front wheel. The electromagnetic valve 15 and a hydraulic actuator 60 are controlled by an electronic control unit (ECU) 70, respectively.

A first master cutoff valve 19 is provided in the first hydraulic oil pipe 17 in the hydraulic actuator 60 and a second master cutoff valve 20 is provided in the second hydraulic oil pipe 18 in the hydraulic actuator 60. The first master cutoff valve 19 cuts off the communication between the mass cylinder 13 and the wheel cylinder 21 when the master cutoff valve 19 is energized to be closed. The second master cutoff valve 20 cuts off the communication between the mass cylinder 13 and the wheel cylinder 22 when the master cutoff valve 20 is energized to be closed. On the other hand, the first master cutoff valve 19 communicates the mass cylinder 13 with the wheel cylinder 21 when the master cutoff valve 19 is not energized to be opened or the energizing degree of the master cutoff valve 19 is lowered to be opened. The second master cutoff valve 20 communicates the mass cylinder 13 with the wheel cylinder 22 when the master cutoff valve 20 is not energized to be opened or the energizing degree of the master cutoff valve 20 is lowered to be opened.

Further, a pressure sensor 17a for detecting master cylinder pressure at the right front wheel side is provided on the first hydraulic oil pipe 17 in the hydraulic actuator 60. A pressure sensor 18a for detecting master cylinder pressure at the left front wheel side is provided on the second hydraulic oil pipe 18 in the hydraulic actuator 60. The depression manipulation force of the brake pedal 11 is acquired on the basis of the master cylinder pressures detected by the pressure sensors 17a and 18a, respectively.

The hydraulic actuator 60 has a pump 26 driven by a motor 27. A pump inlet of the pump 26 is connected to a hydraulic oil pipe 25 communicating with the reserver tank 14. A pump outlet of the pump 26 is connected to a hydraulic oil pipe 30 branching off from the hydraulic oil pipe 25. An accumulator 31, a relief valve 32 and a pressure sensor 33 are provided in the hydraulic oil pipe 30. The accumulator 31 converts pressure energy of the brake oil generated by the pump 26 to pressure energy of filler gas and stores the pressure energy of the filler gas therein. The relief valve 32 opens to return the high pressure brake oil to the hydraulic oil pipe 25 when the pressure of the accumulator 31 exceeds a predetermined value. The relief valve 32 operates in accordance with the pressure of the accumulator 31 detected by the pressure sensor 33.

The hydraulic oil pipe 30 is connected to the wheel cylinder 21 via a pressure intensifying valve 41 for the right front wheel, to the wheel cylinder 22 via a pressure intensifying valve 42 for the left front wheel, to the wheel cylinder 23 via a pressure intensifying valve 43 for the right rear wheel and to the wheel cylinder 24 via a pressure intensifying valve 44 for the left rear wheel. Those pressure intensifying valves 41, 42, 43 and 44 increase the wheel cylinder pressures, respectively when the pressure intensifying valves 41, 42, 43 and 44 are opened. On the other hand, Those pressure intensifying valves 41, 42, 43 and 44 do not increase the wheel cylinder pressures, respectively when the pressure intensifying valves 41, 42, 43 and 44 are closed. The wheel cylinder 21 is connected to a pressure reducing valve 51 for the right front wheel. The wheel cylinder 22 is connected to a pressure reducing valve 52 for the left front wheel. The wheel cylinder 23 is connected to a pressure reducing valve 53 for the right rear wheel. The wheel cylinder 24 is connected to a pressure reducing valve 54 for the left rear wheel. Those pressure reducing valves 51, 52, 53 and 54 reduce the wheel cylinder pressures, respectively when the pressure reducing valves 51, 52, 53 and 54 are opened. On the other hand, the pressure reducing valves 51, 52, 53 and 54 do not reduce the wheel cylinder pressures, respectively when the pressure reducing valves 51, 52, 53 and 54 are closed. The pressure of the wheel cylinder 21 is detected by a pressure sensor 21a. The pressure of the wheel cylinder 22 is detected by a pressure sensor 22a. The pressure of the wheel cylinder 23 is detected by a pressure sensor 23a. The pressure of the wheel cylinder 24 is detected by a pressure sensor 24a.

Next, a configuration of an electromagnetic valve 100 according to the present embodiment will be described in detail with reference to FIGS. 2 to 5. The electromagnetic valve 100 can be used as various electromagnetic valves mounted on the vehicle and, for example, can be used as the pressure reducing valves 51 and 52 described above, respectively. Note that the electromagnetic valve 100 can be also used as the other pressure reducing valves 53 and 54 or the other open/close valves, respectively. The electromagnetic valve 100 corresponds to the electromagnetic valve according to the invention.

Figure 2:
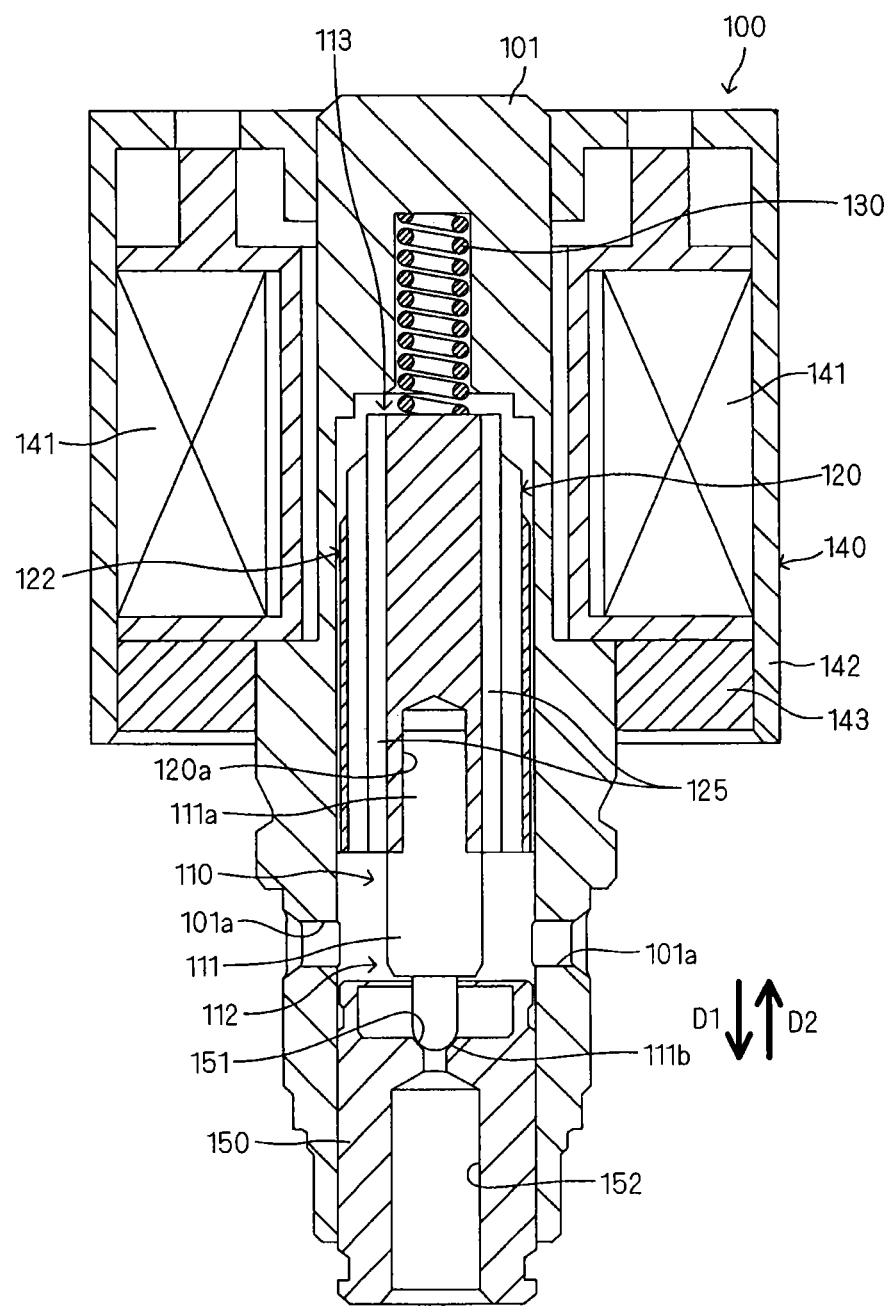
FIG. 2 is a view showing a cross sectional configuration of an electromagnetic valve 100 according to the embodiment.

As shown in FIG. 2, in the electromagnetic valve 100, a valve body unit 110 and an electromagnetic unit 140 are housed in a housing 101. The valve body unit 110 is operated by the electromagnetic force generated by the electromagnetic unit 140 (an electromagnetic coil 141). The valve body unit 110 has a rod 111, a plunger 120 and a sleeve 122 and extends in the longitudinal direction corresponding to the operation direction of the valve body unit 110. The valve body unit 110 corresponds to the valve body unit according to the invention.

The rod 111 has an insert part 111a to be inserted into and secured to a fitting hole 120a provided in the plunger 120 and is secured to the plunger 120 by inserting the insert part 111a into the fitting hole 120a. The rod 111 has a semi-spherical shaped tip end part 111b at the opposite side to the insert part 111a and the tip end part 111b can abut against a valve seat (a valve seat 151 described later) for opening and closing the electromagnetic valve. Accordingly, the rod 111 abuts against the valve seat when the plunger 120 is moved to close the electromagnetic valve and the rod 111 releases the abutment against the valve seat when the plunger 120 is moved to open the electromagnetic valve. The rod 111 corresponds to the rod according to the invention.

The plunger 120 is made of magnetic material and divides a space formed in the housing 101 into valve and spring chambers 112 and 113. In this case, the housing 101 has the valve chamber 112 at an area corresponding to one end of the plunger 120 and has the spring chamber 113 at an area corresponding to the other end of the plunger 120. The rod 111 and a seat 150 are positioned in the valve chamber 112 and a spring 130 is positioned in the spring chamber 113. The plunger 120 is elastically biased in a closing direction D1 of the valve body unit 110 by resilient force of the spring 130 such that the rod 111 approaches the valve seat 151 of the seat 150. As described later in detail, a sleeve 122 covers the plunger 120 to form a communication passage 125 for communicating the valve and spring chambers 112 and 113 with each other. The plunger 120 and the sleeve 122 correspond to the plunger and the sleeve according to the invention, respectively.

The seat 150 has the valve seat 151 provided at a portion facing the tip end part 111b of the rod 111 and a flow passage 152 communicating with the valve seat 151 and is secured to the housing 101. When the activation of the electromagnetic unit 140 is stopped, the tip end part 111b of the rod 111 abuts against the valve seat 151 to close the electromagnetic valve by the resilient force of the spring 130. When the electromagnetic valve is closed, the flow of the hydraulic oil in the flow passage 152 is shut off. On the other hand, when the electromagnetic unit 140 is activated and the tip end part 111b of the rod 111 is moved away from the valve seat 151 against the resilient force of the spring 130 to close the electromagnetic valve, the flow of the hydraulic oil is formed such that the hydraulic oil flows from the flow passage 152 of the seat 150 through the valve chamber 112 into the flow passage 101a of the housing 101. In other words, the direction of biasing the valve body unit 110 by the spring 130 is opposite to the direction of biasing the valve body unit 110 by the electromagnetic unit 140.

The electromagnetic unit 140 includes an electromagnetic coil 141, a coil yoke 142 and a ring yoke 143. The electromagnetic coil 141 is a solenoid positioned outside of the housing 101. The coil yoke 142 is positioned surrounding the electromagnetic coil 141 and the ring yoke 143 is secured to the housing 101. The coil and ring yokes 142 and 143 are magnetic bodies, respectively. Accordingly, the electromagnetic coil 141 is enclosed by the coil and ring yokes 142 and 143 which are the magnetic bodies, respectively. In this case, when the electromagnetic coil 141 is energized, the electromagnetic unit 140 becomes an activated state and magnetic flux (electromagnetic force) is generated for biasing the plunger 120 of the valve body unit 110 in the opening direction D2 against the resilient force of the spring 130. As a result, the plunger 120 moves in the opening direction D2. On the other hand, when the energization of the electromagnetic coil 141 is stopped, the electromagnetic unit 140 becomes a non-activated state and the plunger 120 of the valve body unit 110 is moved in the closing direction D1 by the resilient force of the spring 130. The electromagnetic coil 141 corresponds to the electromagnetic coil according to the invention.

Figure 3:
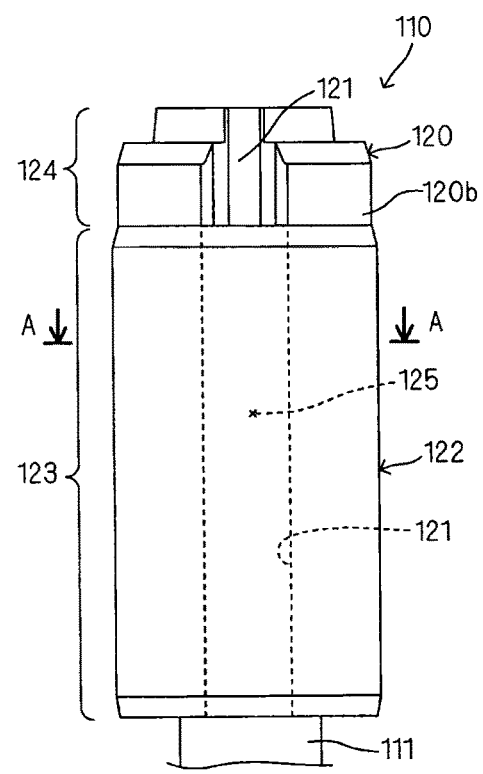
FIG. 3 is a plan view showing a valve body unit 110 shown in FIG. 2.
Figure 4:
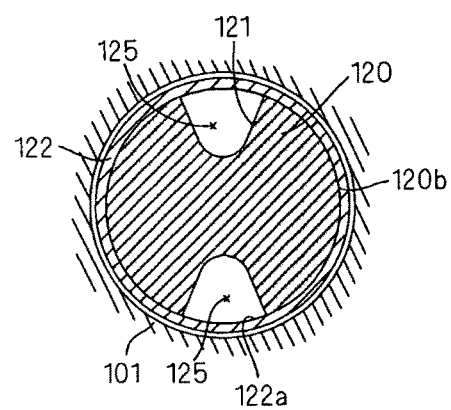
FIG. 4 is a sectional view of the valve body unit 110 along a line A-A of FIG. 3.

As shown in FIGS. 3 and 4, the plunger 120 has a plurality of groove portions 121 (two groove portions 121 in FIG. 4) on the cylindrical outer peripheral face 120b and each of the groove portions 121 has a cylindrical shape and extends in a direction along a cylinder axis. The direction of the cylinder axis corresponds to the direction of the movement (the opening and closing directions D1 and D2) of the valve body unit 110. The groove portion 121 is formed over the entire length of the plunger 120. The sleeve 122 covers the outer peripheral face 120b of the plunger 120 and is a cylindrical member provided integrally with the plunger 120. Typically, the plunger 120 and the sleeve 122 are integrated with each other by press-fitting the plunger 120 into the sleeve 122. The sleeve 122 is configured such that the length of the sleeve 122 in the direction of the cylinder axis is shorter than the length of the plunger 120 in the direction of the cylinder axis. Accordingly, the plunger 120 has a covered area 123 where the groove portions 121 are covered by the sleeve 122 and a non-covered area 124 where the groove portions 121 are not covered by the sleeve 122. As a result, each of the communication passages 125 described above extending in the direction of the cylinder axis of the plunger 120 is defined by a portion of the groove portion 121 corresponding to the covered area 123 of the plunger 120 and the inner peripheral face 122a of the sleeve 122. The communication passage 125 corresponds to the communication passage according to the invention. On the other hand, the recess of the groove portion 121 is maintained at the non-covered area 124 of the plunger 120 because the portion of the groove portion 121 corresponding to the non-covered area 124 is not covered by the inner peripheral face 122a of the sleeve 122.

Incidentally, for the design of this kind of the valve body unit, a technique for forming a communication passage such as the communication passage 125 described above at low cost while reducing a sliding resistance between the valve body unit and the housing is requested. Accordingly, in the valve body unit 100 according to this embodiment, the communication passage 125 is defined by the groove portion 121 of the plunger 120 and the inner peripheral face 122*a* of the sleeve 122. In this case, the cost for forming the communication passage 125 is lower than the cost for forming of the communication passage 125 by penetration-machining the plunger 120. Further, the circularity of the sleeve 122 can be increased by providing the cylindrical sleeve 122 with a desired strength. Thus, the sliding resistance between the sleeve 122 and the housing 101 can be reduced. As a result, the operation performance of the valve body unit 110 can be improved.

Figure 5:
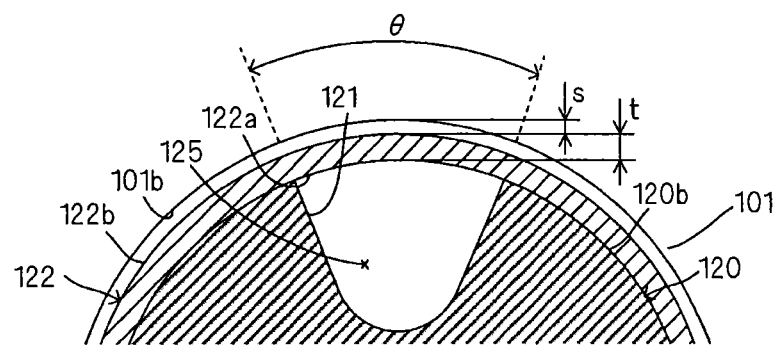
FIG. 5 is a partially enlarged view of FIG. 4.

Further, as shown in FIG. 5, in the valve body unit 100 according to this embodiment, it is preferred that a condition where an arc length of an opening of the groove portion 121 along the circumferential direction of the plunger 120 is smaller than or equal to 20 times of the radial thickness of the sleeve 122, is satisfied. Here, when the outer diameter of the plunger 120 is indicated by d [mm], the opening angle of the groove portion 121 is indicated by $\theta$ [rad] and the thickness of the sleeve 122 is indicated by t [mm], the arc length L [mm] of the opening of the groove portion 121 is $d*\theta/2$. Therefore, when the condition described above is satisfied, a relation of $L/t=(d*\theta)/(2*t) \leq 20$ is established. When this relation is established, the arc length L of the opening of the groove portion 121 can be determined for meeting the thickness t of the sleeve 122. Accordingly, the deformation of the sleeve 122 covering the plunger 120 can be suppressed and the desired circularity of the sleeve 122 can be ensured. For example, the circularity of the sleeve 122 (the difference between the circle defined by the outer face of the cylinder body and the geometrically true circle) can be reduced to about 1 [μm]. On the other hand, if the arc length L of the opening of the groove portion 121 exceeds 20 times of the thickness t of the sleeve 122, the arc portion of the sleeve 122 facing the opening of the groove portion 121 is likely to deform to have a generally straight shape. Therefore, it is difficult to ensure the desired circularity of the sleeve 122. Note that in the electromagnetic valve mounted on the vehicle, the outer diameter d of the plunger 120 is preferably about 6 to 20 [mm].

Further, in the valve body unit 110 according to this embodiment, the sleeve 122 may be preferably made of non-magnetic material (typically, stainless material) and it is preferred that a relation of $t \geq s$ is established when the dimension of the sliding clearance between the outer peripheral face 122*b* of the sleeve 122 and the inner peripheral face 101*b* of the housing 101 is indicated by s [mm]. Accordingly, the magnetic force generated by the electromagnetic coil 141 does not act on the sleeve 122 formed of the non-magnetic material. Therefore, friction (the sliding resistance) generated between the outer peripheral face 122*b* of the sleeve 122 and the inner peripheral face 101*b* of the housing 101 can be reduced. In this case, a value meeting the dimension of the sliding clearance s can be set to the thickness t of the sleeve 122 while a value for suppressing rattling of the sleeve 122 when the sleeve 122 slides can be set to the dimension of the sliding clearance s.

Figure 6:
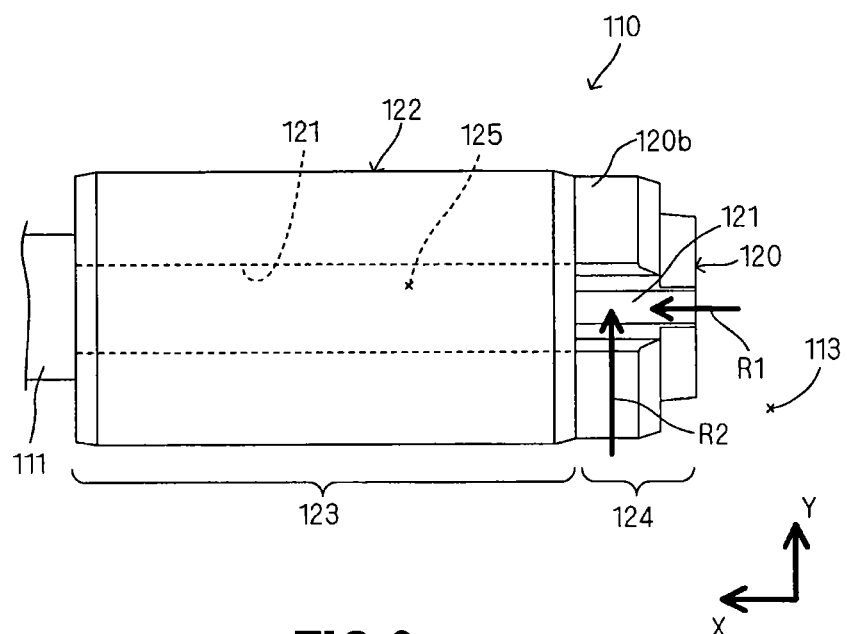
FIG. 6 is a view showing a positioning state of the valve body unit 110 when the electromagnetic valve 100 is mounted on the vehicle.

The electromagnetic valve 100 described above may be positioned in various orientations. However, in the case where the electromagnetic valve 100 is a vehicle electromagnetic valve mounted on the vehicle, as shown in FIG. 6, the electromagnetic valve 100 may be preferably positioned such that the direction along the cylinder axis of the plunger 120 corresponds to the horizontal direction X (the plunger 120 is positioned sideways) when the electromagnetic valve 100 is mounted on the vehicle. In this case, a portion of the groove portion 121 corresponding to the non-covered area 124 of the plunger 120 communicates with the spring chamber 113 (a space outside of the sleeve 122) preferably at least in both of the horizontal direction X (hereinafter, will be also referred to as "the first direction") and a direction Y (hereinafter, will be also referred to as "the second direction") orthogonal to the horizontal direction. Accordingly, the opening area of the groove portion 121 between the covered and non-covered areas 123 and 124 of the plunger 120 is increased. As a result, the gas bubble existing in the spring chamber 113 can be easily introduced from the portion of the groove portion 121 corresponding to the non-covered area 124 into the communication passage 125 corresponding to the covered area 123 of the groove portion 121 by the flows of hydraulic fluid along at least two directions (the first and second directions), thereby to discharge the gas bubble to the valve chamber 112. In this case, in FIG. 6, the route of the gas bubble flowing along the first direction X is indicated by an arrow R1 and the route of the gas bubble flowing along the second direction Y is indicated by an arrow R2.

The invention of this application is not limited to the typical embodiment described above and various applications and modifications can be employed. For example, embodiments described below can be realized by utilizing the embodiment described above.

According to the embodiment described above, two communication passages 125 are provided in the valve body unit 110. However, the number of the communication passage(s) according to the invention of this application is not limited to two. One communication passage 125 or three or more communication passages 125 may be provided in the valve body unit 110. In particular, if the number of the communication passages 125 is large, the cost can be decreased, compared with the case of forming the communication passages by the penetration machining.

According to the embodiment described above, the communication passage 125 communicating the valve and spring chambers 112 and 113 with each other is defined by the groove portion 121 of the plunger 120 and the inner peripheral face 122*a* of the sleeve 122. However, the invention of this application can be applied to a configuration of the communication passage 125 having a function different from the function of the communication passage 125.

Further, according to the embodiment described above, the sleeve 122 made of the non-magnetic material is used. However, as necessary, the sleeve 122 may be made of the magnetic material.

In the embodiment described above, the plunger 120 has the covered area 123 where the groove portion 121 is covered by the sleeve 122 and the non-covered area 124 where the groove portion 121 is not covered by the sleeve 122. However, according to the invention of this application, the plunger 120 may have a configuration without the non-covered area 124, in other words, may have a configuration in which the groove portion 121 is completely covered by the sleeve 122.

Further, according to the invention of this application, if the desired strength of the sleeve 122 can be ensured by selecting the material of the sleeve 122 and the like appropriately, the arc length L of the opening of the groove portion 121 may be larger than 20 times of the thickness t of the sleeve 122.

Further, according to the embodiment described above, the pressure reducing valves 51 and 52 of the brake control device 10 are exemplified as the electromagnetic valve 100 mounted on the vehicle. However, the invention of this application can be applied to the electromagnetic valve for an anti-lock brake system (ABS) installed on the vehicle and the electromagnetic valve installed in various devices other than the vehicle.

The invention claimed is:
1. An electromagnetic valve including a valve body unit housed in a housing and an electromagnetic coil, said valve body unit comprising:
   a plunger having a groove portion at a cylindrical outer peripheral face of said plunger, said groove portion extending in a cylinder axis direction, said plunger moving in said cylinder axis direction by electromagnetic force generated by said electromagnetic coil;
   a rod secured to said plunger, said rod abutting against a valve seat for opening and closing said electromagnetic valve when said plunger is moved to close said electromagnetic valve and releasing the abutment of said rod against said valve seat when said plunger is moved to open said electromagnetic valve;
   a cylindrical sleeve configured to cover said outer peripheral face of said plunger and integrally formed with said plunger; and
   a communication passage defined by said groove portion of said plunger and an inner peripheral face of said sleeve and extending in said cylinder axis direction, wherein
   said electromagnetic valve is a vehicle electromagnetic valve mounted on a vehicle and is positioned such that said cylinder axis direction of said plunger extends in a horizontal direction that is parallel to the horizon when said electromagnetic valve is mounted on said vehicle,
   said plunger comprises:
      a covered area where said groove portion is covered by said sleeve; and
      a non-covered area where said groove portion is not covered by said sleeve, and
   said groove portion corresponding to said non-covered area communicates with a space outside of said sleeve at least in the horizontal direction and the direction orthogonal to the horizontal direction.

2. The electromagnetic valve according to claim 1, wherein said valve body unit is configured such that an arc length of an opening of said groove portion along the circumferential direction of said plunger is smaller than or equal to 20 times of a thickness of said sleeve along the radial direction of said sleeve.

3. The electromagnetic valve according to claim 1, wherein said sleeve is made of non-magnetic material and the thickness of said sleeve along the radial direction of said sleeve is larger than or equal to a dimension of a sliding clearance between said outer peripheral face of said sleeve and said housing.

4. The electromagnetic valve according to claim 1, wherein said housing comprises:
   a valve chamber provided at an area corresponding to a first end of said plunger, said valve chamber housing said rod; and
   a spring chamber provided at an area corresponding to a second end of said plunger, said spring chamber housing a spring for elastically biasing said plunger against the electromagnetic force generated by said electromagnetic coil,
   said valve and spring chambers communicate with each other via said communication passage.

* * * * *